Dec. 20, 1932.   H. F. GRUMAN   1,891,308
COMBINED SEAMING AND PINKING MACHINE
Filed Aug. 6, 1930   3 Sheets-Sheet 1
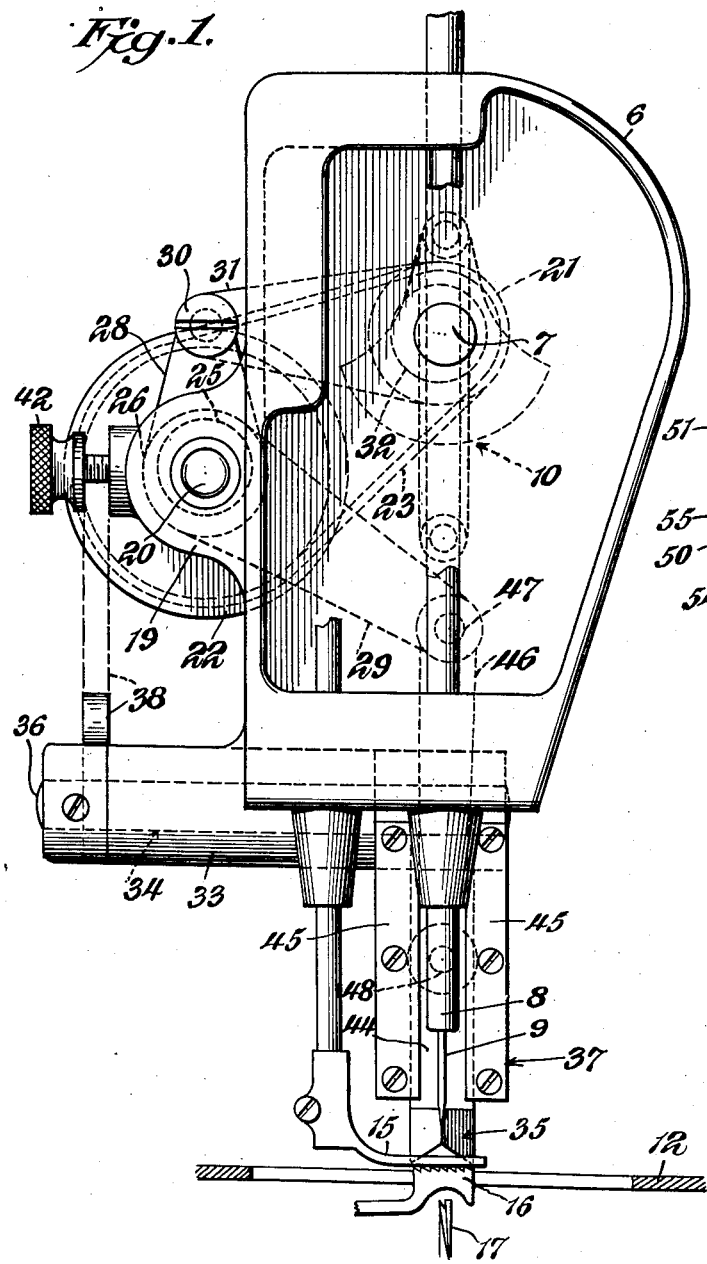
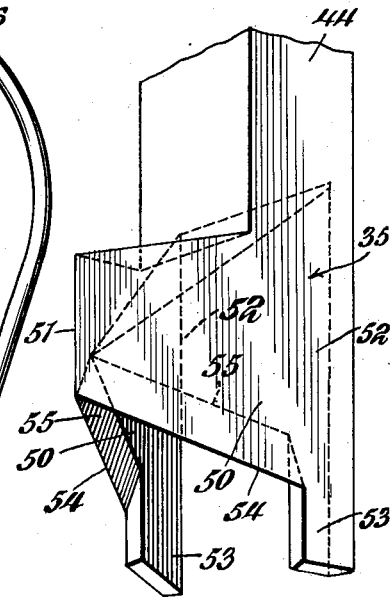
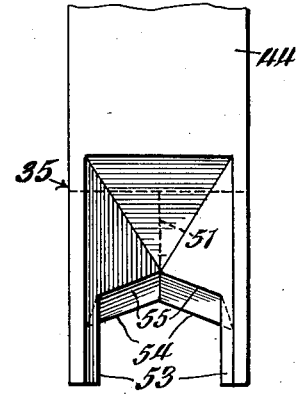
Inventor,
Horace F. Gruman,
By S. George Tate
Attorney.

Dec. 20, 1932.   H. F. GRUMAN   1,891,308
COMBINED SEAMING AND PINKING MACHINE
Filed Aug. 6, 1930   3 Sheets-Sheet 2
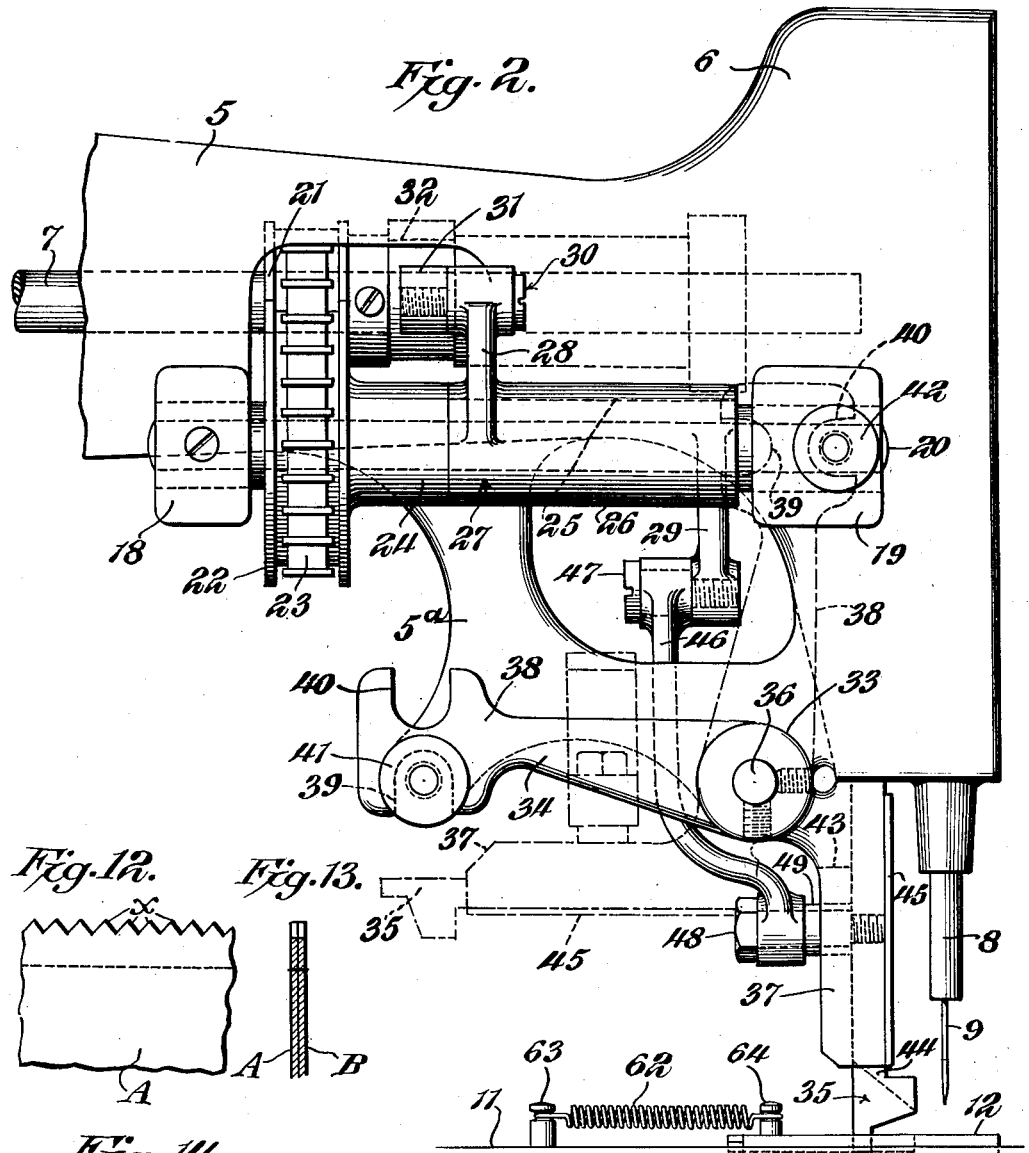
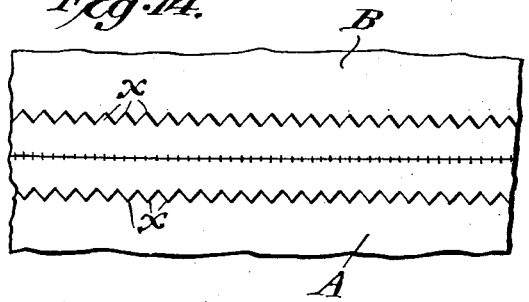
Inventor,
Horace F. Gruman,
By S. George Tate
Attorney Dec. 20, 1932.  H. F. GRUMAN  1,891,308
COMBINED SEAMING AND PINKING MACHINE
Filed Aug. 6, 1930  3 Sheets-Sheet 3
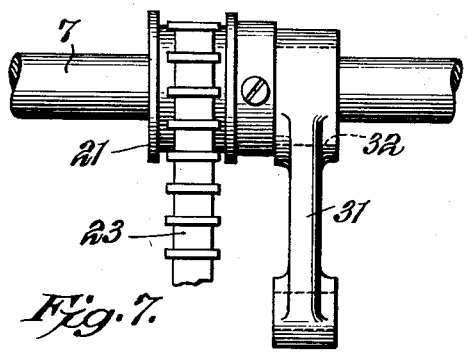
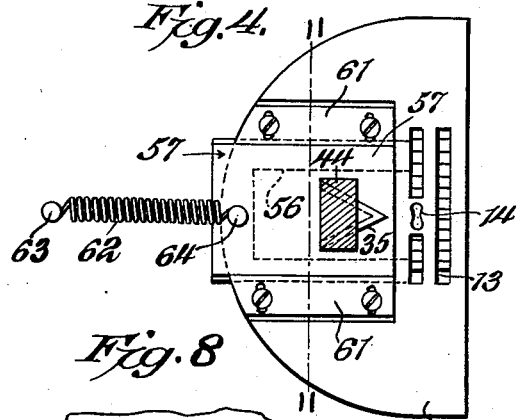
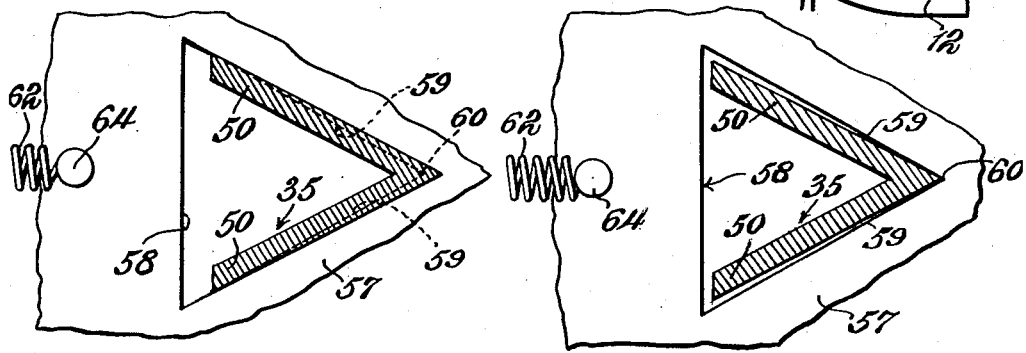
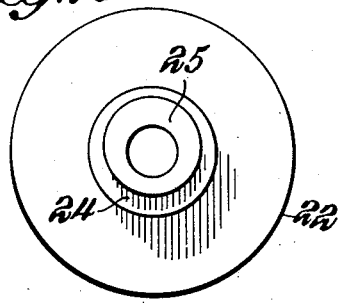
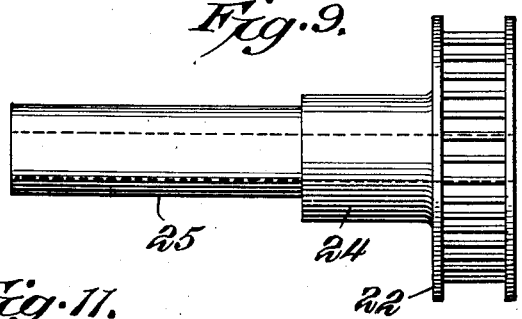
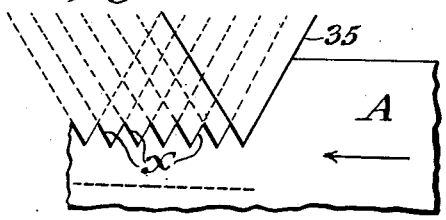
Horace F. Gruman, Inventor,
By S. George Tate
Attorney.

Patented Dec. 20, 1932

1,891,308

UNITED STATES PATENT OFFICE

HORACE FRANKLYN GRUMAN, OF ST. LOUIS, MISSOURI, ASSIGNOR TO LEWIS INVISIBLE STITCH MACHINE COMPANY, OF ST. LOUIS, MISSOURI, A CORPORATION OF MAINE

COMBINED SEAMING AND PINKING MACHINE

Application filed August 6, 1930. Serial No. 473,404.

This invention relates to new and useful improvements in sewing machines especially adapted for performing a seaming and a pinking or trimming operation simultaneously.

Among the several objects of my invention are to provide a pinking means which includes a vertically reciprocable V-shaped movable trimmer blade and a cooperating ledger blade wherein the latter is maintained in yieldable contact with the former so as to insure a proper shearing action between the blades; to provide a movable trimming blade which is vertically reciprocated in synchronism with the needle and which is rendered ineffective automatically during certain reciprocations of the needle; to provide such a trimming mechanism in which the movable trimmer blade may be disconnected from its operating mechanism and then moved to an inoperative position and retained in such position whenever it is desired to employ the machine for seaming purposes only, and to provide a trimming mechanism which consists of comparatively few parts and is therefore simple in construction and cheap to manufacture.

With these and other objects in view which will more fully appear, the nature of the invention will be more clearly understood by following the description, the appended claims, and the several views illustrated in the accompanying drawings.

In the drawings:—

Figure 1 is a left hand elevation of a sewing machine constructed in accordance with my invention, Figure 2 is a rear elevation thereof, Figure 3 is a detailed horizontal view of a part of the trimming driving mechanism, Figure 4 is a horizontal plan view of the throat plate, ledger blade, and movable trimmer blade, Figure 5 is a perspective view of the movable trimmer blade, Figure 6 is a view in elevation of the movable trimmer blade looking from the heel portion thereof toward the toe portion, Figure 7 is an enlarged diagrammatic view showing the normal angular relation between the walls of the movable cutting element and the converging cutting edges of the ledger blade, the movable element being in its uppermost position, Figure 8 is a similar view but showing the relative positions of the blades when the movable blade is in its lowermost position, Figure 9 is a side elevation of a combined sprocket wheel and eccentric for bodily elevating the movable trimmer blade, Figure 10 is an end elevation thereof, Figure 11 is an enlarged vertical sectional view taken on the line 11—11 of Figure 4, Figure 12 is a detailed plan view showing the fabrics seamed and pinked by my invention, Figure 13 is a sectional view therethrough, Figure 14 is a plan view showing the fabrics after they have been opened and the pinked marginal edge portions flattened, and Figure 15 is a view more or less diagrammatically showing the overlapping relation of the movable trimmer blade during the pinking operation.

Like reference numerals designate corresponding parts throughout the several figures of the drawings.

Referring to the accompanying drawings, 5 indicates an overhanging arm of a sewing machine, and 6 the needle head which is located at the free end thereof. Journaled in the overhanging arm is a rotary shaft 7, and vertically reciprocable in the needle head 6 is a needle bar 8 carrying a needle 9, the needle bar being given a complete reciprocation during each revolution of the main shaft 7 by a needle driving mechanism indicated as a whole at 10. Disposed below the overhanging arm 5 is a work support 11 and mounted upon said support is a throat plate 12 having feed slots 13 and a needle opening 14 formed therein. Also mounted on the needle head 6 is a presser foot 15 which is disposed directly above the feed slots 13 and needle opening 14. Cooperating with the presser foot 15 below the throat plate 12 for feeding the work rearwardly is a feed dog 16 and cooperating with the needle below the work plate is a looper 17 or any other suitable complemental stitch forming mechanism.

Fixed in spaced bearings 18 and 19 on the rear face of the overhanging arm 5 is a jack shaft 20 disposed in parallelism with the main shaft 7. A pulley 21 is fixed to the main shaft 7; a pulley 22 is journaled on the jack shaft 20, and a belt 23 engages both pulleys and rotates the pulley 22 once to every two revolutions of the main shaft. The pulley 22 is provided with a hub 24 and extending laterally from an integral with this hub is an eccentric 25 which surrounds the jack shaft. The pulley 22 and the eccentric 25 are located between the bearings 18 and 19, and journaled on the eccentric 25 is a hub 26 of a bell crank lever 27 having rock arms 28 and 29 at its opposite ends. The arm 28 is pivotally connected by a pivot screw 30 to one end of a link 31, the other end of said link surrounding an eccentric 32 fixed to the main shaft 7.

Thus the bell crank lever 27 is given one complete oscillation by the eccentric 32 during each rotation of the main shaft 7, and the bell crank lever 27 is bodily raised and lowered by the eccentric 25 during every two revolutions of the main shaft 7, that is, the bell crank lever is raised during one revolution of the main shaft and lowered during the next succeeding revolution of the main shaft. Thus the bell crank arm 29 will be given a complete oscillation during each rotation of the main shaft 7, and also a bodily up and down movement during every two revolutions of the main shaft 7.

Journaled in a bearing 33 integral with the needle head 6 and located below the jack shaft 20 is a frame 34 for supporting a vertically reciprocable trimmer blade 35 at one side of the needle. This frame 34 includes a horizontal pivot shaft 36 which is journaled in the bearing 33, a radially disposed arm 37 for holding the trimmer blade 35 and a radially extending clamping arm 38. The holder arm 37 and the clamping arm 38 are fixedly secured to the pivot shaft 36 by set screws. The holder arm 37 normally extends downwardly below the pivot shaft 36 in a vertical plane and the clamping arm 38 normally extends laterally from the pivot shaft 36 in a horizontal plane and in a plane at right angles to the holder arm 37. The free end of the clamping arm 38 is provided with oppositely disposed and inwardly extending recesses 39 and 40. When the trimmer frame 34 is in its normal or operative position the clamping arm 38 is engaged by a clamping screw 41 threaded into a web 5a integral with and depending from the overhanging arm 5 the shank of the screw 41 being located in the recess 39. When it is desired to swing the trimmer frame 34 to an inoperative position the clamping screw 41 is released and the frame is swung on the pivot shaft 36 to the dotted line position, wherein a clamping screw 42 threaded into the needle head 6 will function to clamp the frame 34 with the holder arm 37 thereof in the horizontal position above the throat plate, the shank of the screw 42 extending through the recess 40 of the clamping arm 38.

The holder arm 37 is provided with an elongated slot 43, the major axis of which is vertical when the holder is in its normal or operating position. The holder arm 37 is normally positioned at one side of the needle bar 8, and that side of the arm 37 adjacent the needle bar is formed with a longitudinal groove for receiving the shank 44 of the movable trimmer blade 35. This shank 44 is rectangular in cross section and is guided in its vertical reciprocatory movements by guide plates 45, 45 which are detachably secured to the arm 37. The trimmer blade 35 is reciprocated vertically from the rock arm 29 of the bell crank lever 27 through the medium of a link 46 having its upper end connected to the rock arm 29 by a pivot screw 47 and having its lower end connected to the shank 44 of the trimmer blade 35 by a pivot bolt 48 which passes through the slot 43 and has threaded engagement with said shank 44. A spacing sleeve 49 surrounds the pivot bolt 48 and is located between the lower end of the link 46 and the shank 44 of the movable trimmer blade 35 and extends into the slot 43.

The trimmer blade 35 is preferably formed integral with the lower end of the shank 44 and includes vertical walls 50, 50, which in horizontal cross section are substantially V-shaped, the walls merging at one end to form a toe portion 51 and resultant heel portions 52, 52 at the other end. Depending from the heel portions 52, 52 are guide extensions 53, 53, and the lower edges of the walls 50, 50 between the extensions 53, 53 and the toe portion 51 are inclined upwardly toward said toe portion as indicated at 54, 54 and are inwardly beveled as at 55, 55 to form cutting edges.

The throat plate 12 directly under the movable cutting blade 35 is provided with a rectangular recess 56 and slidably mounted on the throat plate above said recess is a ledger blade 57 formed with a triangular shaped opening 58 of a size substantially equal to the size in cross section of the movable trimmer blade 35. The opening 58 includes two converging cutting edges 59, 59 of an angle slightly more than the angle of the cutting walls 50, 50 of the movable cutting blade. The extensions 53, 53 of the movable cutting blade 35 extend into the opening 58 of the ledger blade and normally bear against the ends of the cutting edges 59, 59 at points remote from the apex or toe portion 60 of the opening 58. The ledger blade 57 is supported on the throat plate 12 for movements in a line extending in a plane at right angles to the line of feed through the medium of guide plates 61, 61 which are adjustably fixed to the throat plate 12 so as to permit the ledger blade 57 to be adjusted with nicety relative to the movable cutting blade 35.

A coil spring 62 has one end connected to a post 63 fixed to the work support 11 and the other end connected to a post 64 fixed to the ledger blade 57 and functions to maintain the cutting edges 59, 59 of the ledger blade 57 in contact with the walls 50, 50 and the cutting edges 54, 54 of the movable blade 35 thereby insuring a clean shearing cutting action to be made. Thus when the movable blade 35 is moved downwardly the ledger blade 57, by reason of the difference in angular relationship of the cutting walls 50, 50 relative to the cutting edges 59, 59 will be moved toward the needle and against the tension of the spring 62, and when the movable blade 35 is elevated the spring 62 will return the ledger blade 57 to its normal position, the return movement being limited by the guide extensions 53 engaging the cutting edges 59 of the ledger blade.

In operation two pieces of fabric A and B are arranged in superposed relation and fed past the stitch forming mechanism and the trimming mechanism by the feed dog 16. A line of straightaway stitches is thus formed and these stitches join the two pieces of fabric A and B. Simultaneously with the stitching operation the movable trimmer blade 35 is reciprocated by the eccentric 32 and bell crank lever 27, a complete reciprocation of the movable blade 35 being made during each revolution of the main shaft 7. During every other revolution of the main shaft, the bell crank lever 27 and the movable blade 35 will be elevated by the eccentric 25 a distance sufficient to render the movable blade ineffective without disconnecting the driving connections, the guide extensions 53 being of sufficient length to maintain contact with the cutting edges 59 of the ledger blade and thereby maintain the movable blade in cooperative relation with the ledger blade. The trimmer blade is timed with the needle 9 so as to form a pink or cut $x$ with every other downward movement of the needle bar. The length of the cutting edges 54, 54 is considerably greater than the length of the edges of a resultant pink and consequently the movable trimmer blade 35 during its cutting operations necessarily overlaps the previously formed pink $x$ as shown in Figure 15, thereby insuring a clean-cut apex to the pinks.

When it is desired to employ this machine for seaming operations only, the movable cutter element may be swung upwardly and retained in its inoperative position. To this end, the pivot screw 47 is withdrawn, thus disconnecting the movable trimmer blade 35 from the operating arm 29 of the bell crank lever 27. The clamping screw 41 is then released and the operator then swings the trimmer frame 34 to the dotted line position and clamps the arm 38 in said position by the clamping screw 42. The pivot screw 47 is then re-positioned in the arm 29. It will be understood that as soon as the pivot screw 47 has been removed the movable blade 35 can be elevated until the guide extensions 53, 53 have cleared the ledger blade 57 so as to permit the trimmer frame 34 to be swung upwardly to its inoperative position as above described.

It is of course to be understood that the details of structure and arrangements of parts may be variously changed and modified without departing from the spirit and scope of my invention.

I claim:—

1. A combined seaming and pinking machine including a vertically reciprocable needle, and pinking mechanism disposed at one side of the needle and including a horizontally disposed ledger blade having an opening forming converging cutting edges, and a blade movable upwardly and downwardly with respect to the ledger blade and having converging cutting walls cooperating with the cutting edges of the ledger blade, the angle of the cutting edges of the ledger blade being more than the angle of the cutting walls of the movable blade.

2. A combined seaming and pinking machine including a vertically reciprocable needle, and a pinking mechanism disposed at one side of the needle and including a horizontally disposed ledger blade having an opening forming converging cutting edges, and a blade movable upwardly and downwardly with respect to the ledger blade and having converging cutting walls cooperating with the cutting edges of the ledger blade, and means for maintaining the cutting edges of the ledger blade and the cutting walls of the movable blade in yieldable engagement with each other during cutting movements of the movable blade.

3. A combined seaming and pinking machine including a vertically reciprocable needle, and a pinking mechanism disposed at one side of the needle and including a horizontally disposed ledger blade having an opening forming converging cutting edges, and a blade movable upwardly and downwardly with respect to the ledger blade and having converging cutting walls cooperating with the cutting edges of the ledger blade, the angle of the cutting edges of the ledger blade being more than the angle of the cutting walls of the movable blade, and means for maintaining the cutting edges of the ledger blade and the cutting walls of the movable blade in yieldable engagement with each other during cutting movements of the movable blade.

4. A combined seaming and pinking machine including a vertically reciprocable needle, and a pinking mechanism disposed at one side of the needle and including a horizontally disposed ledger blade having an opening forming converging cutting edges, and a blade movable upwardly and downwardly with respect to the ledger blade and having converging cutting walls cooperating with the cutting edges of the ledger blade, and a spring connected to the ledger blade for maintaining the cutting edges thereof in yieldable engagement with the cutting walls of the movable blade during cutting movements of the latter.

5. A combined seaming and pinking machine including a vertically reciprocable needle, and a pinking mechanism disposed at one side of the needle and including a horizontally disposed ledger blade having an opening forming converging cutting edges, and a blade movable upwardly and downwardly with respect to the ledger blade and having converging cutting walls cooperating with the cutting edges of the ledger blade, the angle of the cutting edges of the ledger blade being more than the angle of the cutting walls of the movable blade, and a spring connected to the ledger blade for maintaining the cutting edges thereof in yieldable engagement with the cutting walls of the movable blade during cutting movements of the latter.

6. A combined seaming and pinking machine including a vertically reciprocable needle, and a pinking mechanism disposed at one side of the needle and including a horizontally disposed ledger blade having an opening forming converging cutting edges, and a blade movable upwardly and downwardly with respect to the ledger blade and having converging cutting walls cooperating with the cutting edges of the ledger blade, said walls forming a resultant toe portion and spaced heel portions, the latter being provided with depending extensions disposed in constant engagement with the divergent end portions of the cutting edges of the ledger blade.

7. A combined seaming and pinking machine including a vertically reciprocable needle, and a pinking mechanism disposed at one side of the needle and including a horizontally disposed ledger blade having an opening forming converging cutting edges, and a blade movable upwardly and downwardly with respect to the ledger blade and having converging cutting walls cooperating with the cutting edges of the ledger blade, said walls forming a resultant toe portion and spaced heel portions, the latter being provided with depending extensions disposed in constant engagement with the divergent end portions of the cutting edges of the ledger blade, the lower ends of the walls of the movable blade between the extensions and the toe portion being inclined upwardly and inwardly beveled.

8. A combined seaming and pinking machine including a vertically reciprocable needle, and a pinking mechanism disposed at one side of the needle and including a horizontally disposed ledger blade having an opening forming converging cutting edges, and a blade movable upwardly and downwardly with respect to the ledger blade and having converging cutting walls cooperating with the cutting edges of the ledger blade, the angle of the cutting edges of the ledger blade being more than the angle of the cutting walls of the movable blade, said walls forming a resultant toe portion and spaced heel portions, the latter being provided with depending extensions disposed in constant engagement with the divergent end portions of the cutting edges of the ledger blade.

9. A combined seaming and pinking machine including a vertically reciprocable needle, and a pinking mechanism disposed at one side of the needle and including a horizontally disposed ledger blade having an opening forming converging cutting edges, and a blade movable upwardly and downwardly with respect to the ledger blade and having converging cutting walls cooperating with the cutting edges of the ledger blade, said walls forming a resultant toe portion and spaced heel portions, the latter being provided with depending extensions disposed in constant engagement with the divergent end portions of the cutting edges of the ledger blade, and means for maintaining the cutting edges of the ledger blade and the cutting walls of the movable blade in yieldable engagement with each other during cutting movements of the movable blade.

10. A combined seaming and pinking machine including a vertically reciprocable needle, and a pinking mechanism disposed at one side of the needle and including a horizontally disposed ledger blade having an opening forming converging cutting edges, and a blade movable upwardly and downwardly with respect to the ledger blade and having converging cutting walls cooperating with the cutting edges of the ledger blade, said walls forming a resultant toe portion and spaced heel portions, the latter being provided with depending extensions disposed in constant engagement with the divergent end portions of the cutting edges of the ledger blade, the lower ends of the walls of the movable blade between the extensions and the toe portion being inclined upwardly and inwardly beveled, and a spring connected to the ledger blade for maintaining the cutting edges thereof in yieldable engagement with the cutting walls of the movable blade during cutting movements of the latter.

11. In a combined seaming and trimming machine, the combination of a stitch forming mechanism including a vertically reciprocable needle, and a trimming mechanism including a ledger blade and a blade movable upwardly and downwardly with respect to the ledger blade and cooperating therewith, means for reciprocating the movable blade in synchronism with the needle, and means for automatically rendering the movable blade ineffective during certain reciprocations of the needle.

12. In a combined seaming and trimming machine, the combination of a stitch forming mechanism including a vertically reciprocable needle, and a trimming mechanism including a ledger blade and a blade movable upwardly and downwardly with respect to the ledger blade and cooperating therewith, means for reciprocating the movable blade in synchronism with the needle, and automatic means for bodily elevating the movable blade out of cutting relation with the ledger blade during certain reciprocations of the needle without disconnecting the movable blade reciprocating means.

13. In a combined seaming and trimming machine, the combination of a stitch forming mechanism including a main shaft and a vertically reciprocable needle operated thereby, and a trimming mechanism including a ledger blade and a blade movable upwardly and downwardly with respect to the ledger blade and cooperating therewith, and means for reciprocating the movable blade in synchronism with the needle and for automatically rendering the movable blade ineffective during certain reciprocations of the needle comprising a bell crank connection between the shaft and the movable blade for reciprocating the latter, and means operated by the shaft for bodily raising the bell crank and the movable blade during certain rotations of said shaft.

14. In a combined seaming and trimming machine, the combination of a stitch forming mechanism including a main shaft and a vertically reciprocable needle operated thereby, and a trimming mechanism including a ledger blade and a blade movable upwardly and downwardly with respect to the ledger blade and cooperating therewith, and means for reciprocating the movable blade in synchronism with the needle and for automatically rendering the movable blade ineffective during certain reciprocations of the needle comprising a jack shaft, an eccentric journaled on the jack shaft, a bell crank lever fulcrumed on the eccentric, driving connections between the movable blade and the bell crank lever and between the main shaft and the bell crank lever for imparting a reciprocation to the movable blade during each rotation of the main shaft, and driving connections between the main shaft and the eccentric for rotating the latter once during each two revolutions of the main shaft.

15. In a combined seaming and trimming machine, the combination of a stitch forming mechanism including a main shaft and a vertically reciprocable needle operated thereby, and a trimming mechanism including a ledger blade and a blade movable upwardly and downwardly with respect to the ledger blade and cooperating therewith, a pivotally mounted trimmer holder for slidably supporting the movable blade, means for retaining the holder in either an operative or inoperative position, and means for reciprocating the movable blade when the holder is in operative position including readily disengageable driving connections.

16. A combined seaming and pinking machine including a reciprocable needle, and a pinking mechanism disposed at one side of the needle and including cooperating pinking elements having complementary V-shaped cutting edges, means for reciprocating one element relatively to the other element for causing the cutting edges to move toward and from cutting relation, means to mount one element for movement relatively to the other for varying frictional contact of the cutting edges, and means cooperating with said element mounting to yieldably hold the cutting edges in frictional engagement during operation.

17. A combined seaming and pinking machine including a vertically reciprocable needle, and a pinking mechanism disposed at one side of the needle and including a horizontally disposed ledger blade having an opening forming converging cutting edges, and a blade movable upwardly and downwardly with respect to the ledger blade and having converging cutting walls cooperating with the cutting edges of the ledger blade, and means including a mounting for one of said blades enabling movement thereof relatively to the other blade in a direction for causing their cutting edges to frictionally engage in a greater or lesser degree and means for so moving said blade for maintaining the cutting edges of the ledger blade and the cutting walls of the movable blade in yieldable engagement with each other during cutting movements of the movable blade.

18. A combined seaming and pinking machine including a vertically reciprocable needle, and a pinking mechanism disposed at one side of the needle and including a horizontally disposed ledger blade having an opening forming converging cutting edges, a blade movable upwardly and downwardly with respect to the ledger blade and having converging cutting walls cooperating with the cutting edges of the ledger blade, and means including a spring for maintaining the cutting edges of the ledger blade and the cutting walls of the movable blade in yieldable engagement with each other during cutting movements of the movable blade.

19. A combined seaming and pinking machine including a reciprocable needle, and a pinking mechanism disposed at one side of the needle and including a horizontally disposed cutting element having an opening forming converging cutting edges, a cooperating cutting element movable upwardly and downwardly with respect to the horizontally disposed element and having converging cutting walls cooperating with the cutting edges, and means cooperating with one of said elements for maintaining the cutting edges and the cutting walls in yieldable engagement during cutting movements of said movable element.

20. A combined seaming and pinking machine including a reciprocable needle, and a pinking mechanism disposed at one side of the needle and including a horizontally disposed cutting element having an opening forming converging cutting edges, a cooperating cutting element movable upwardly and downwardly with respect to the horizontally disposed element and having converging cutting walls cooperating with the cutting edges, and a spring cooperating with one of said elements for maintaining the cutting edges and the cutting walls in yieldable engagement during cutting movements of said movable element.

21. A combined seaming and pinking machine including a reciprocable needle, and a pinking mechanism disposed at one side of the needle and including a horizontally disposed ledger blade having an opening forming converging cutting edges, and a cutting blade movable upwardly and downwardly with respect to the ledger blade and having converging cutting walls forming a resultant toe portion, and means depending from the cutting blade and engaging the ledger blade for maintaining the cooperative relation of said blades.

22. A combined seaming and pinking machine including a reciprocable needle, and a pinking mechanism disposed at one side of the needle and including a horizontally disposed ledger blade having an opening forming converging cutting edges, and a cutting blade movable upwardly and downwardly with respect to the ledger blade and having converging cutting walls forming a resultant toe portion, means depending from the cutting blade and engaging the ledger blade for maintaining the cooperative relation of said blades, and means to yieldably hold the cutting edges and cutting walls in engagement during the pinking action.

23. A combined seaming and pinking machine including a reciprocable needle, and a pinking mechanism disposed at one side of the needle and including a horizontally disposed ledger blade having an opening forming converging cutting edges, and a cutting blade movable upwardly and downwardly with respect to the ledger blade and having converging cutting walls forming a resultant toe portion, said walls including depending heel portions for engaging in the ledger blade opening and maintaining the cutting relation between said cutting walls and the cutting edges.

24. A combined seaming and pinking machine including a reciprocable needle, and a pinking mechanism disposed at one side of the needle and including a horizontally disposed ledger blade having an opening forming converging cutting edges, and a cutting blade movable upwardly and downwardly with respect to the ledger blade and having converging cutting walls forming a resultant toe portion terminating at its lower end in inclined edges bearing shearing relation to the ledger blade cutting edges, said walls including depending heel portions for engaging in the ledger blade opening and maintaining the cutting relation between said cutting walls and the cutting edges, and means to yieldably hold the cutting edges and cutting walls in engagement during the pinking action.

25. In a combined seaming and trimming machine, the combination of a stitch forming mechanism including a vertically reciprocable needle, and a trimming mechanism including a ledger blade and a blade movable upwardly and downwardly with respect to the ledger blade and cooperating therewith, and means for positively reciprocating the movable blade in timed relation with the needle including devices for automatically rendering the movable blade ineffective during certain reciprocations of the needle.

26. In a combined seaming and trimming machine wherein is provided a sewing head carrying an overhanging arm and a main shaft rotatable in the overhanging arm, the combination of a stitch forming mechanism including a vertically reciprocable needle, and a trimming mechanism including a ledger blade and a blade movable upwardly and downwardly with respect to the ledger blade and cooperating therewith, and means including a reduction gearing connection with the main shaft for reciprocating the movable blade in timed relation with the needle including devices for automatically rendering the movable blade ineffective during certain reciprocations of the needle.

27. In a combined seaming and trimming machine, the combination of a stitch forming mechanism including a vertically reciprocable needle, and a trimming mechanism including a ledger blade and a blade movable upwardly and downwardly with respect to the ledger blade and cooperating therewith, driving means for the needle, and means for imparting positive reciprocations to the movable blade in timed relation with but less in number than the needle reciprocations and including speed reduction gear connections with the needle driving means and an element eccentrically rotated by the gear connections and having driving connection with the movable blade.

In testimony whereof I affix my signature.

HORACE FRANKLYN GRUMAN.